United States Patent
Ulrey et al.

(10) Patent No.: US 7,546,834 B1
(45) Date of Patent: Jun. 16, 2009

(54) SELECTABLY FUELING WITH NATURAL GAS OR DIRECT INJECTION ETHANOL

(75) Inventors: Joseph Norman Ulrey, Dearborn, MI (US); Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/111,833

(22) Filed: Apr. 29, 2008

(51) Int. Cl.
*F02M 21/02* (2006.01)
(52) U.S. Cl. .................. 123/525; 123/526; 123/529; 123/576; 123/577
(58) Field of Classification Search ............. 123/27 GE, 123/525, 526, 529, 575, 576, 579
See application file for complete search history.

(56) References Cited

U.S. PATENT DOCUMENTS

| | | | | |
|---|---|---|---|---|
| 4,441,475 A | * | 4/1984 | Bouchard et al. | 123/525 |
| 4,463,734 A | * | 8/1984 | Akeroyd | 123/525 |
| 4,878,475 A | * | 11/1989 | Birsa | 123/525 |
| 5,224,457 A | * | 7/1993 | Arsenault et al. | 123/526 |
| 5,526,797 A | | 6/1996 | Stokes | |
| 5,549,083 A | * | 8/1996 | Feuling | 123/179.5 |
| 5,566,653 A | * | 10/1996 | Feuling | 123/179.8 |
| 5,775,282 A | * | 7/1998 | Smith | 123/179.8 |
| 6,250,260 B1 | * | 6/2001 | Green | 123/27 GE |
| 6,408,828 B1 | * | 6/2002 | Wheeler | 123/479 |
| 6,591,817 B2 | | 7/2003 | Deutsch | |
| 7,051,713 B2 | * | 5/2006 | Mashiki | 123/431 |
| 7,228,841 B2 | | 6/2007 | Takemoto et al. | |
| 2001/0003977 A1 | | 6/2001 | Hayashi et al. | |
| 2004/0139944 A1 | | 7/2004 | Nakano et al. | |

* cited by examiner

*Primary Examiner*—Erick Solis
(74) *Attorney, Agent, or Firm*—Allan J. Lippa; Alleman Hall McCoy Russell & Tuttle LLP (57) ABSTRACT

Various approaches are described for controlling operation of an engine. One example method includes delivering a gaseous fuel to the engine during a first operating range when an amount of stored gaseous fuel is greater than a threshold; and disabling the delivery of the gaseous fuel during the first operating range when the amount of stored gaseous fuel is less than the threshold and delivering a second fuel to operate the engine, yet continuing to deliver the gaseous fuel to start the engine during a cold start even when the amount of stored gaseous fuel is less than the threshold.

19 Claims, 7 Drawing Sheets

FIG. 7

SELECTABLY FUELING WITH NATURAL GAS OR DIRECT INJECTION ETHANOL

FIELD

The present application relates to engine operation using a plurality of different fuels.

BACKGROUND AND SUMMARY

Some vehicles may use bi-fuel engines operating on either a first gaseous fuel (such as compressed hydrogen, liquefied propane gas (LPG), or compressed natural gas (CNG)), or a second liquid fuel (such as gasoline). For example, engines may be bi-fueled with CNG-gasoline or LPG-gasoline. The above mentioned systems combust either the first fuel or the second fuel for engine operation. The fuels are injected either through a single injector or through different injectors into the combustion chamber of the internal combustion engine.

U.S. Pat. No. 7,228,841 describes a vehicle with an engine that uses gaseous hydrogen and gasoline. In this example, fuel is injected through two separate injectors into the combustion chamber. The fuel type is switched from one to the other depending on engine operating conditions, environmental conditions, and operator demand. For instance, if a storage level of gaseous hydrogen decreases below a predetermined amount or if it is determined that the vehicles has exited out of a city to suburbs, fuel supplied to the engine is automatically switched from gaseous hydrogen to gasoline.

However, the inventors herein have recognized disadvantages with such an approach. For example, if the vehicle has operated in city conditions for an extended duration, the hydrogen supply may be depleted. Thus, when starting the engine during subsequent operation, there may be an insufficient supply of hydrogen or hydrogen pressure to start the engine if it is desired to use gaseous fuel preferentially, even when the level of gaseous fuel in the tank is low.

In one approach, the above issues may be addressed by a method for controlling operation of an engine comprising delivering a gaseous fuel during a first operating range when an amount of stored gaseous fuel is greater than a threshold; and disabling the delivery of the gaseous fuel during the first operating range when the amount of stored gaseous fuel is less than the threshold and delivering a second fuel to operate the engine, yet continuing to deliver the gaseous fuel to start the engine during a cold start even when the amount of stored gaseous fuel is less than the threshold.

In this way, even when a supply of gaseous fuel is running low, gaseous fuel may be automatically and preferentially used for starting by disabling its use during the first operating range. In this way, it is possible to achieve a greater number of cold starts using the gaseous fuel. Such preferential use of the gaseous fuel for cold starts, rather than other engine running conditions, can be beneficial in reducing emissions. For example, emissions reductions can be achieved by using the gaseous fuel for starting rather than normal engine operation occurring after the emission system has reached its operating temperature.

DETAILED DESCRIPTION

A vehicle may operate with gaseous fuel and liquid fuel, injected separately and/or concurrently into the combustion chamber. In one example, the gaseous fuel may include CNG, and the liquid fuel may include directly injected (DI) ethanol or an ethanol-gasoline blend. In this system, engine starting may preferentially use the gaseous fuel to reduce starting emissions before an emission control device has reached its operating temperature, particularly during cold (non-warmed) starting conditions. Also, during engine running, high-octane gaseous fuel and/or DI liquid fuel may be used to reduce knock limits at higher loads. Further, under selected warmed-up engine running conditions, the gaseous fuel may enable improved fuel economy, reduced emissions, and improved maximum engine output torque (such as during boosted conditions).

However, when the gaseous supply is reduced (e.g., to a first level where it is still possible to operate with the gaseous fuel during at least starting conditions), gaseous fuel injection is disabled during some operating conditions (conditions that would otherwise use gaseous fuel, or a combination of gaseous fuel and liquid fuel). Instead, liquid fuel injection is used without gaseous fuel injection for these operating conditions. For example, when gaseous fuel injection is disabled, the engine may still operate at those conditions using direct injection of the liquid fuel. Further, since the conditions may reduce the maximum available torque, the system may compensate by readjusting the maximum available torque, and thus scale the operator's request appropriately.

If the gaseous fuel supply is reduced further (e.g., to a second level below the first level), then liquid fuel may be used for starting, and the gaseous fuel may be disabled during all operating conditions. Alternatively, a combination of liquid and gaseous fuel injection may be used for starting. Under such conditions, the engine may operate with a delayed start to motivate the vehicle operator to refuel the gaseous fuel.

Such operation may take advantage of increased thermal efficiency and increased boost (via increased knock suppression) of gaseous fuels, such as CNG, as well as directly injected liquid fuels, such as gasoline-ethanol blends (e.g., E85).

Figure 1:
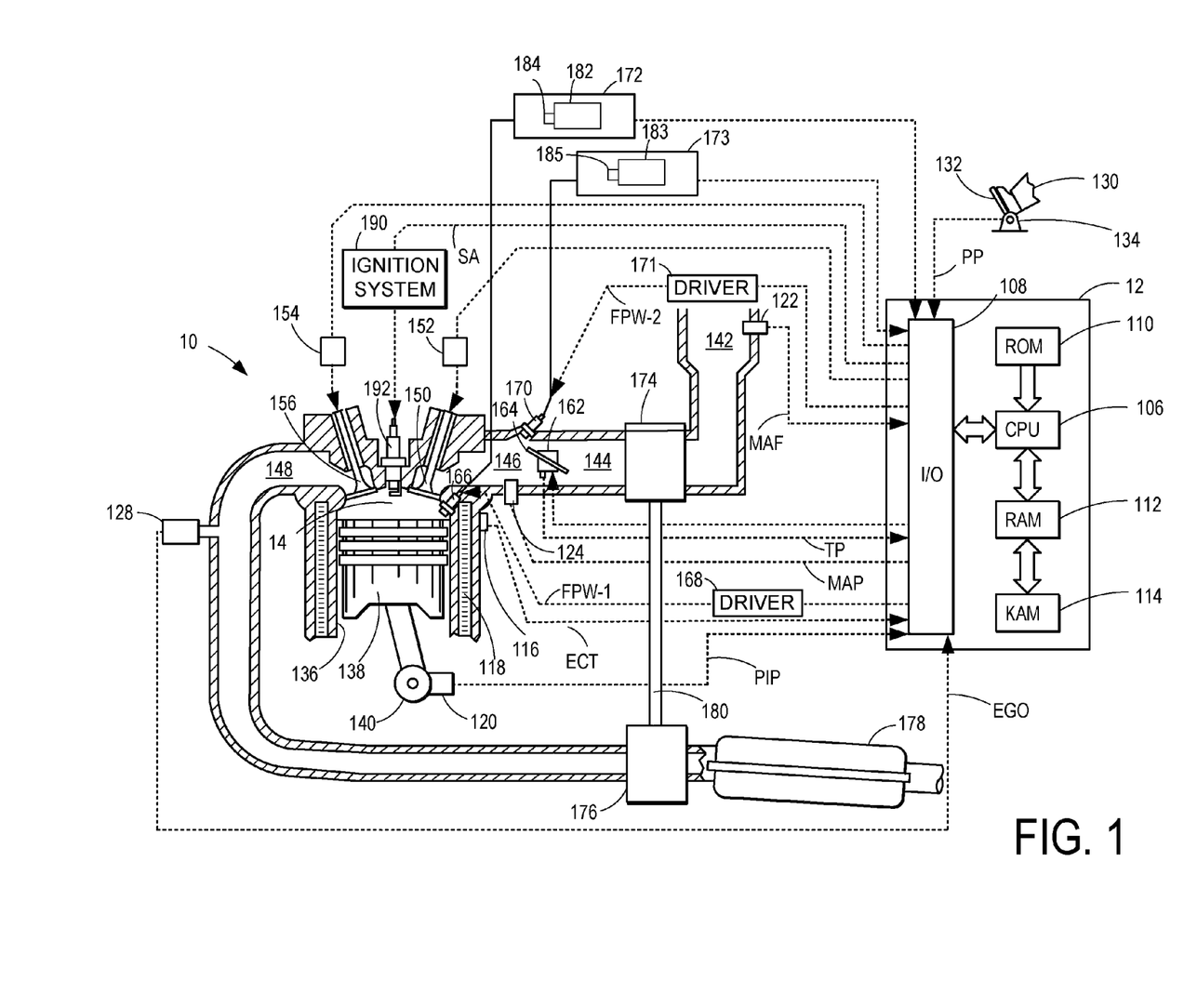
FIG. 1 depicts an example embodiment of one cylinder of an internal combustion engine.

Turning now to the figures, FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from first fuel system 172, which may be a liquid fuel system, including a fuel tank, fuel pumps, and a fuel rail. In one example as shown in FIG. 1, fuel system 172 may include a fuel tank 182 and a fuel sensor 184, for example a liquid level sensor, to detect the storage amount in the fuel tank 182. Alternatively, fuel may be delivered by a single stage fuel pump at lower pressure, in which case the timing of the direct fuel injection may be more limited during the compression stroke than if a high pressure fuel system is used. Additionally, a fuel composition sensor may be provided for determining an alcohol content of the fuel.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by a second fuel system 173, which may be a high pressure fuel system, including a fuel tank, a fuel pump, and a fuel rail. In one example as shown in FIG. 1, the fuel system 173 may include a pressurized gas fuel tank 183, and a fuel pressure sensor 185 to detect the fuel pressure in the fuel tank 183. The fuel pressure sensor 185 may identify a plurality of storage levels, including at least two reserve thresholds. The two reserves may include a first pressure level and a second pressure level in the tank 183, where the first pressure level is higher than the second pressure level. Note that a single driver 168 or 171 may be used for both fuel injection systems, or multiple drivers, for example driver 168 for fuel injector 166 and driver 171 for fuel injector 170, may be used, as depicted.

The fuel system 172 may be a liquid fuel system. For example, the liquid fuel may include gasoline, E85, and mixtures thereof. The fuel system 173 may be a gaseous fuel system. For example, the gaseous fuels may include CNG, hydrogen, LPG, LNG, etc. Each of the two fuels and fuel systems may provide knock suppression capabilities that can be utilized to reduce knock limits, for example at higher load and/or boosted operating conditions. Based on fuel availability, either of the fuels can be selected as a primary fuel, with the other used as a knock suppressing fuel. In one example, when gasoline is used as the primary fuel during certain engine operating conditions, CNG may be used as knock suppressant and adjusted in response to a potential for engine knock, or feedback of actual knock. In another example, when CNG is used as the primary fuel during some operating conditions, for example during engine running, ethanol may be introduced and adjusted in response to a potential for engine knock, or feedback of actual knock. The delivery of the different fuels may be referred to as a fuel type, such that the fuel type may be varied by injection relatively more or less of the liquid fuel compared with the gaseous fuel, or vice versa.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described hereinbelow. The relative distribution of the total injected fuel among injectors 166 and 170 may be referred to as an injection type. For example, injecting all of the fuel for a combustion event via injector 166 may be an example of a first injection type, injecting all of the fuel for a combustion event via injector 170 may be an example of a second injection type, injecting two-thirds of the fuel for a combustion event via injector 166 and the other third of the fuel via injector 170 may be an example of a third injection type, injecting a third of the fuel for a combustion event via injector 166 and the other two-thirds of the fuel via injector 170 may be an example of a fourth injection type. Note that these are merely examples of different injection types, and various other types of injection and delivery may be used, and further the approach may be applied to more than two injectors as well. Additionally, it should be appreciated that port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc.

Figure 2:
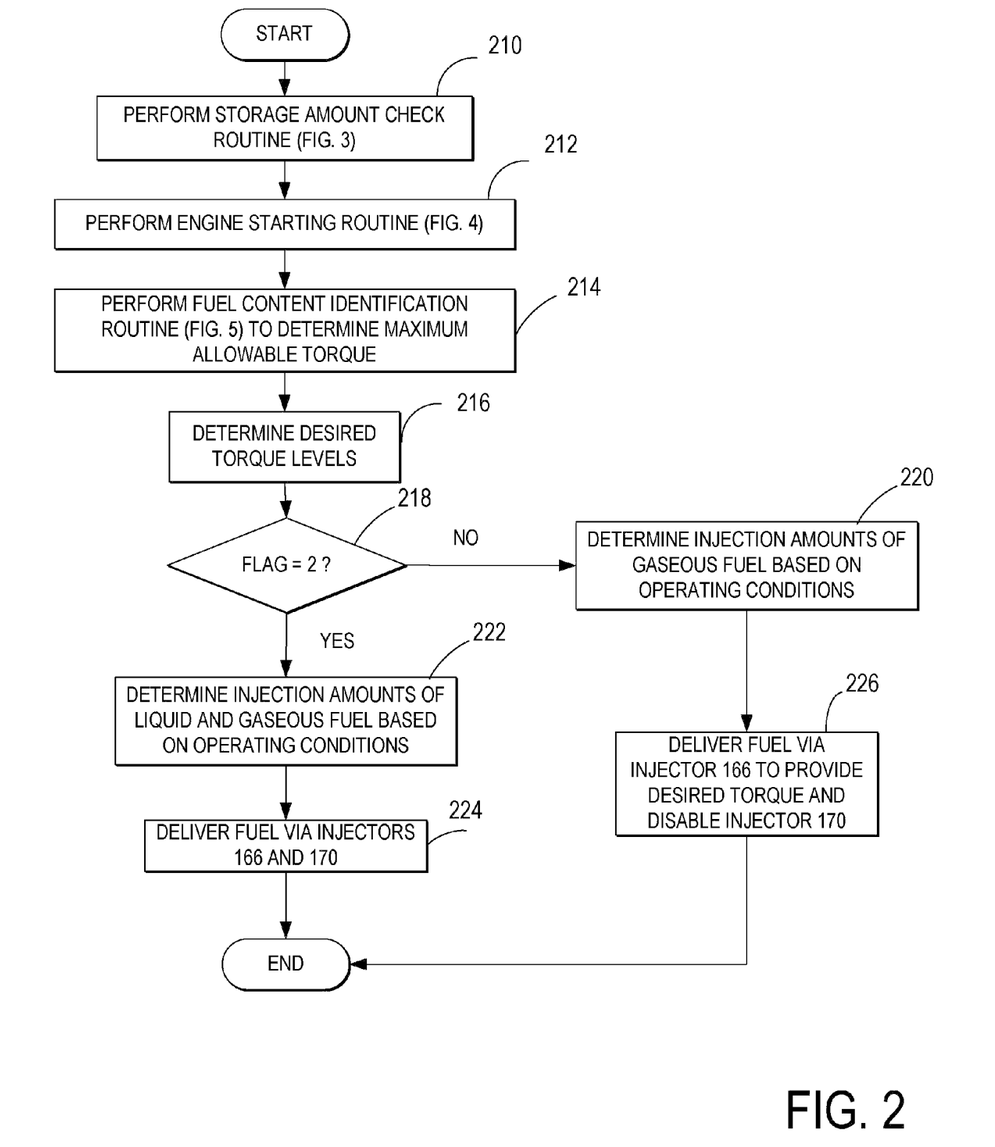
FIG. 2 depicts an example process flow for an overall engine operation routine.

FIG. 2 depicts an example process flow for controlling operation of engine 10. While FIG. 2 describes one example mode of operation of the engine 10, it should be understood that there may be other modes as well.

At 210, a fuel storage and/or availability amount determination is performed for a gaseous fuel tank, such as tank 183. Additional details are described herein with regard to FIG. 3. In this example, the fuel storage amount determination may include measuring a storage pressure in tank 183, such as based on sensor 185 to determine whether a storage amount of the gaseous fuel is below one or more reserve thresholds.

At 212, an engine starting routine is performed to provide engine starting operation when requested. Additional details of an example engine starting routine are described herein with regard to FIG. 4. The engine starting routine may provide various operations, including selectively starting the engine with different fuel types, or combinations of fuel types, depending on the stored amount of the various fuel types and/or operating conditions.

At 214, a fuel content identification routine is performed. The routine determines characteristics of one or more of the stored fuel types on-board the vehicle, such as alcohol content, alcohol percent, etc. As one example, the routine may determine an alcohol (e.g. ethanol) concentration of a liquid fuel stored in tank 182. Additionally, the routine may set maximum available engine output torque depending on the characteristics of the fuel mixture used in tank 172. One example routine is described with regard to FIG. 5. The routine may adjust the maximum available engine torque to take into account reductions in torque that may be produced. For example, when the liquid fuel has a reduced ethanol concentration, knock limits may result in reduced boosting, thus reducing maximum torque. Likewise, the displacement of fresh air caused by increased gaseous fuel injection may also reduce maximum available torque.

At 216, a desired engine torque level is determined. Desired engine output torque may be set based on vehicle speed and driver pedal position PP, for example. Additionally, the routine limits the desired engine output torque to the maximum available torque noted above with regard to FIG. 5.

Figure 3:
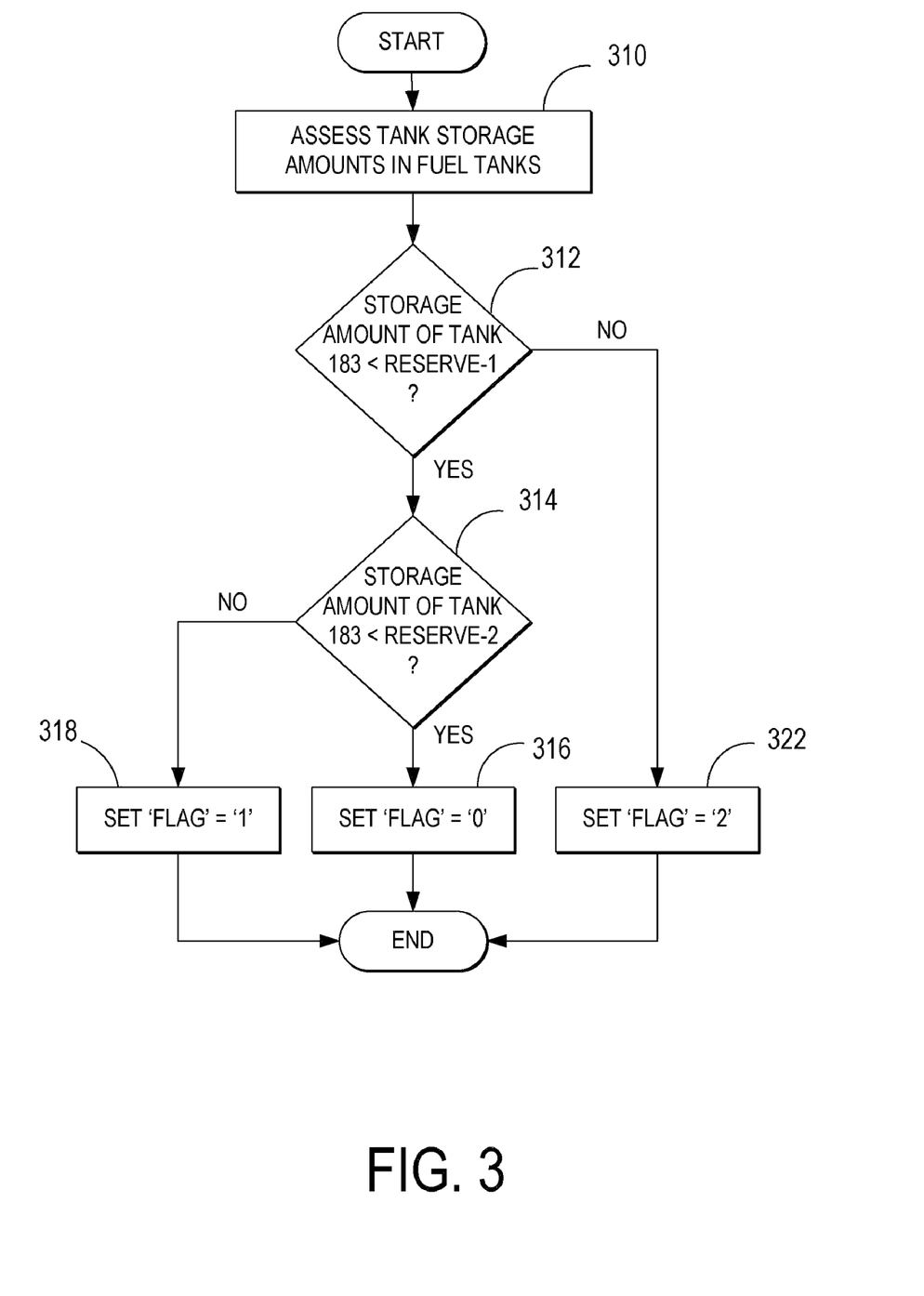
FIG. 3 depicts an example process flow for an engine starting routine.

At 218, the routine checks a fuel availability flag, (FLAG) that may be set in the routine of FIG. 3. In this example, the routine determines whether FLAG is set to '2', indicating that, as noted herein FIG. 3, the fuel storage amount in fuel tank 183 is sufficient to perform engine operation during a plurality of operating conditions, including starting, warmed up operation, low and high loads, etc. If FLAG is not '2', there is an insufficient supply of the gaseous fuel stored in fuel tank 173 for at least some operating conditions, and the routine continues to 226.

When FLAG is set to '2', the routine continues to 222, where a determination is made as to how to operate the engine to achieve the desired torque. In one example, the routine may determine a desired airflow, and thus boost level, desired fuel injection amount, injection type, and fuel type. The routine may determine a distribution of the fuel injection amount among the various fuel types based on the energy density of the fuels, the injector characteristics, and combustion characteristics, such as knock limits. In particular, the routine may select the fuel type and injection type to primarily utilize gaseous fuel, and selectively add the liquid fuel to abate engine knock, or address engine knock limits. The distribution selected may utilize gaseous fuel, liquid fuel, or a combination of gaseous and liquid fuels.

Figure 6:
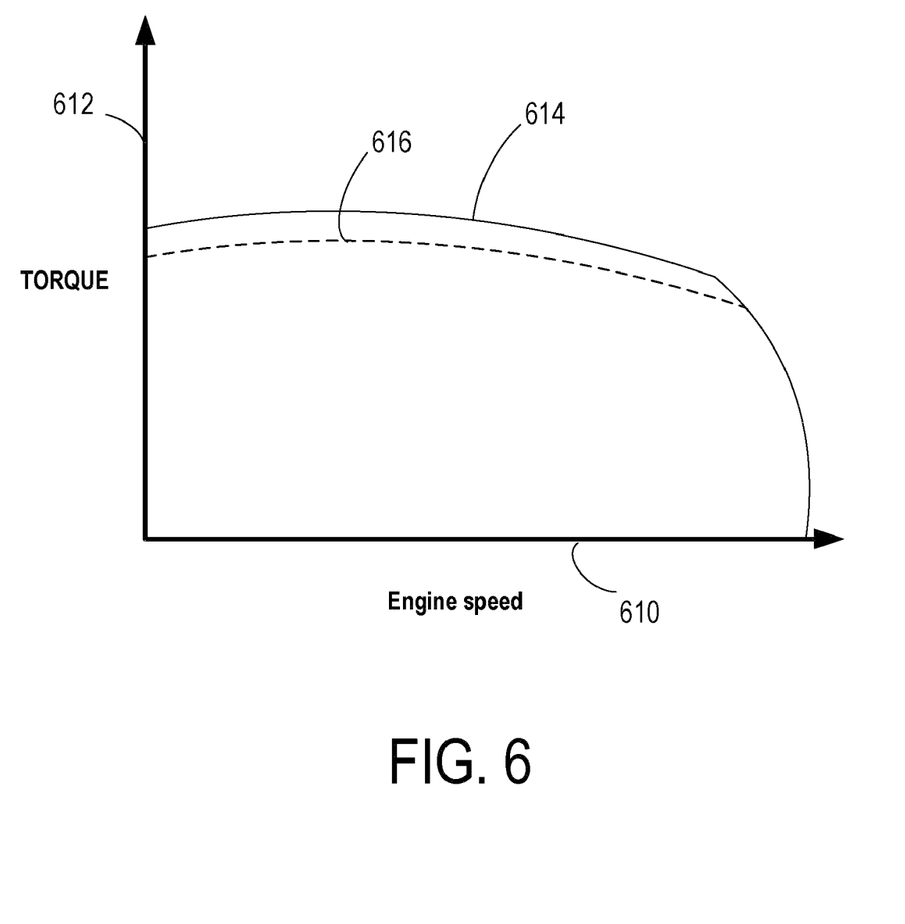
FIG. 6 graphically illustrates variation of maximum engine torque with RPM.

In one example embodiment, as noted in FIG. 6, a fuel delivery map for a CNG-ethanol system, under both high and low load operating conditions, is illustrated. As shown, under high load naturally aspirated operation, there may be power loss in the system if CNG is used as the only fuel, due to the displacement of fresh air by the gaseous fuel. Further, engine knock may occur. Thus, to achieve increased power, ethanol may be additionally directly injected increasingly as load increases, for example. Further, boosting may be employed under such conditions.

While the above map shows one potential example, various alternatives may also be used. For example, the fuel map may be adjusted with various operating conditions, including based on fuel levels in the fuel tanks 182 and/or 183. Further, either fuel may be used independently across engine operating conditions, including engine starting and engine running conditions.

At 222, injection amounts of the two fuels, CNG and ethanol, are determined. The injection amounts may vary depending on engine operating conditions including, but not limited to, one or more of the following: engine speed, engine load, engine output (e.g. torque, power, etc.), ambient temperature, humidity, knocking, boost level, etc. In one example embodiment, as noted herein FIG. 7, when CNG is used during engine running conditions, ethanol injection may be started/increased as engine torque levels increase, such as during high load and/or boosted conditions. Further, ethanol injection may be increased responsive to engine knock, or the potential for engine knock.

Note that during selected operating conditions, the system may operate primarily with gaseous fuel, such as during lower loads, coasting, idling, etc.

At 224, fuel injection amounts as determined at 218 are delivered. In one example, in engine 10, based on the injection amounts of CNG and ethanol as evaluated at 218, corresponding pulse width signals FPW-1 and FPW-2 are sent through drivers 168 and 171, to injectors 166 and 170 respectively. Ethanol may be injected via direct injector 166, and CNG may be injected via port injector 170. The respective amounts of CNG and ethanol may be controlled by controlling the timing of the injectors, as well as injection pressure, for example.

When FLAG is not set to '2', the routine continues to 220. At 220, the routine determines an injection amount of liquid fuel, such as ethanol or an ethanol-gasoline blend based on operating conditions. Then, at 226, the liquid fuel is delivered to provide the desired torque. Thus, in the absence of sufficient gaseous fuel pressure in fuel tank 183, injector 170 may be disabled, and injector 168 may be enabled to deliver fuel to the engine.

In this way, it is possible to utilize the gaseous fuel during selected operating conditions to potentially reduce operating costs, while conserving the fuel preferentially for engine starting. Further, engine efficiency may be increased via knock suppression capacities of the liquid and/or gaseous fuel or fuel delivery method.

FIG. 3 depicts an example process flow for performing a fuel storage determination routine, such as referred to at 210 of FIG. 2.

At 310, the fuel storage amount in the tank 183 is determined. In one example embodiment, as noted herein, the fuel storage amount in the tank 183 is detected with the pressure sensor 185. Alternatively, or in addition, the routine may sense a weight of stored fuel in tank 183.

In one example embodiment, the routine may determine the storage pressure of the gaseous fuel with respect to two reserve thresholds. In the example where a full tank capacity of fuel tank 173 may be approximately 3600 psi, a first reserve (reserve-1) may be set at 900 psi of CNG, and a second reserve (reserve-2) may be set at 200 psi. Thus, the routine may identify first whether the storage is below the first reserve, where a sufficient supply of gaseous fuel is available for engine starting, but not other engine running conditions. The routine may also identify whether the storage is below the second reserve, where the supply is insufficient for both engine starting and running conditions.

At 312, a check is performed to determine whether fuel storage amount of tank 183 has fallen below a first pressure reserve level. At 314, a second check is performed to determine whether storage amount in the fuel tank 173 has fallen below the second reserve, reserve-2.

When the answer to 312 is yes and 314 is yes, at 316, the flag (FLAG) is set to '0'.

Otherwise, when the answer to 312 is yes, and the answer to 314 is no, at 318, FLAG is set to '1'. Further, when the answer to 312 is no, at 322, FLAG is set to '2'.

Figure 4:
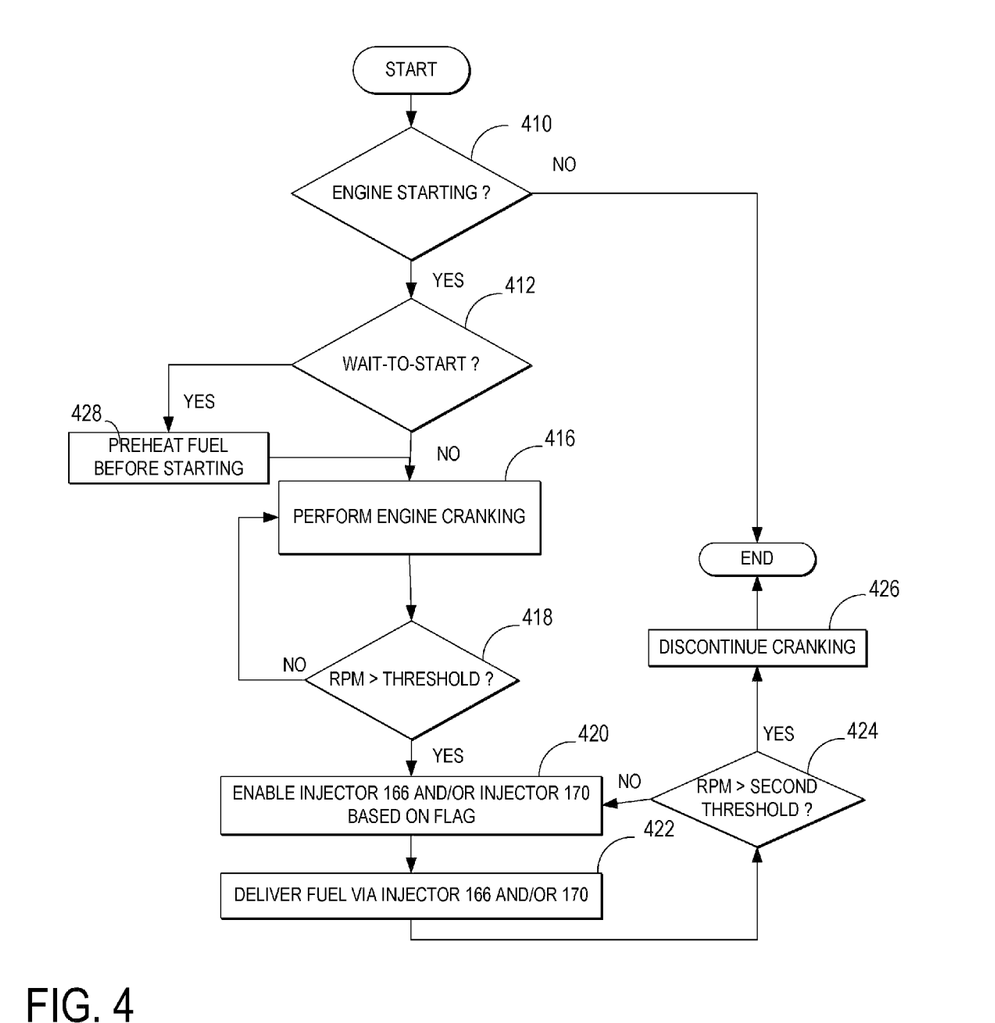
FIG. 4 depicts an example process flow for a fuel level monitoring routine.
Figure 5:
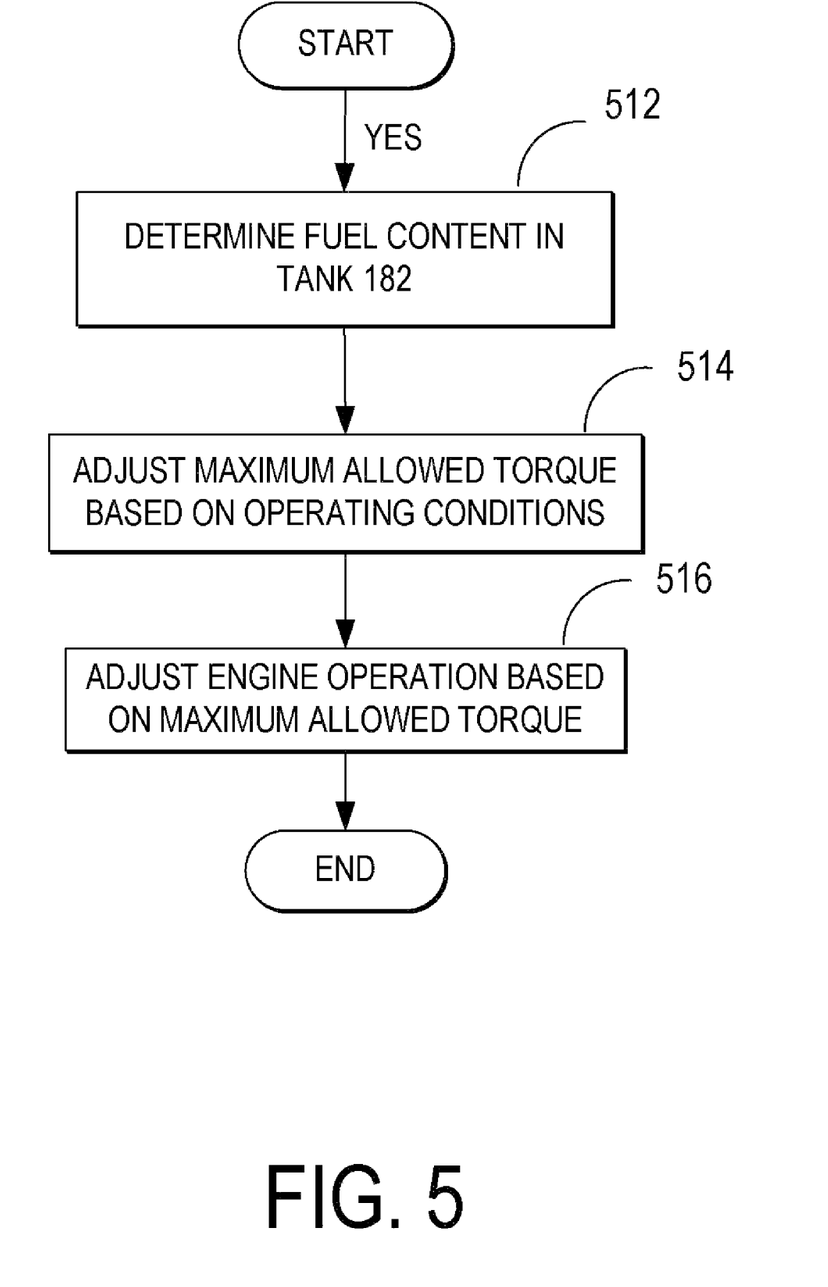
FIG. 5 depicts an example process flow for a fuel content identification routine.

As noted, the flag (FLAG) is checked at various other routines, such as at 218 of FIG. 2, and 420 of FIG. 4, for example. An analogous case would be done for the liquid fuel level (FIG. 5).

Referring now to FIG. 4, it describes one example process flow for starting the engine. At 410, the routine determines whether the engine is in a starting mode. For example, the starting mode may be set in response to an operator request to start the engine, and/or in response to an automatic engine start.

During starting, the routine continues to 412, where the routine determines whether a wait-to-start mode is selected. For example, under selected conditions, a wait-to-start feature may be performed where a waiting period is first carried out before the engine is cranked. Such conditions may include when the engine is starting with a liquid fuel (e.g., FLAG=0) and when the engine has been shut down for an extended duration. Additionally, during the waiting period, at 428, the fuel may be preheated before starting to improve starting combustion and reduce starting emissions.

From either 428, or when the answer to 412 is no, the routine continues to 416, where the engine is cranked. For example, a starter motor is coupled with crank shaft 140, and rotates the engine to facilitate combustion.

Then, at 418, the routine determines whether the engine speed has reached a minimum threshold speed above which fuel injection commences. If the engine speed has not reached the threshold then the routine continues cranking as described at 416. Otherwise, at 420, injector 166 and/or injector 170 may be enabled based on operating conditions and the flag (FLAG). For example, gaseous fuel may be preferentially used to fuel the engine during cranking and starting. However, when insufficient pressure, for example, is present, liquid fuel may be used in addition to, or in place of, the gaseous fuel. In one example, if FLAG is set to '1' or '2', there is sufficient gaseous fuel pressure to perform starting, whereas if FLAG is set to '0', it may mean that there is an insufficient supply or pressure for gaseous fuel starting.

At 422, fuel is delivered via the enabled injectors to commence and/or continue combustion during the start. Then, at 424, a second check on engine speed is performed to determine whether idle conditions have been achieved, for example, where the second engine speed threshold is greater than the first. Finally, at 426, engine cranking is discontinued.

In this way, different fuel types and/or injection types may be enabled during starting based on operating conditions, as well as storage levels of the fuels.

Referring now to FIG. 5, it describes an example process flow of fuel-content check routine. In particular, the routine may identify a fuel type in a fuel tank.

At 512, the routine determines a content of the liquid fuel in liquid fuel tank 172. In one example, the routine determines an alcohol content of the fuel, such as an ethanol-gasoline fraction, percent, and/or ratio.

Then, at 514, a maximum allowable engine output torque may be determined based on the alcohol content of the liquid fuel. For example, the alcohol content of the liquid fuel may affect the effectiveness of knock suppression performance related to direct injection of the liquid fuel. As such, reduced alcohol content may reduce the maximum torque the engine generates at selected operating conditions (e.g., maximum torque may be limited by knock). As such, as shown in FIG. 6, the maximum allowable engine torque for a given condition may be reduced as the alcohol content of the liquid fuel is reduced. Specifically, the dotted line in FIG. 6 figuratively shows an example reduced maximum allowed engine torque when the liquid fuel is gasoline and/or E10.

At 516, engine operation is adjusted based on the maximum allowed engine torque. For example, an operator's torque request may be scaled based on the maximum allowed torque, such that the operator receives maximum torque at full actuation of the pedal.

Referring now specifically to FIG. 6, it figuratively shows variation of torque with RPM. The horizontal axis 610 represents engine speed, and the vertical axis 612 represents engine output torque. The upper curve 614 shows maximum engine output when the liquid fuel includes a greater amount of ethanol than the dashed curve 616.

In addition, maximum engine torque may be reduced if an insufficient amount of liquid fuel is available, such as based on a level of tank 182. Likewise, maximum engine torque may be reduced if an insufficient amount of gaseous fuel is available.

Figure 7:
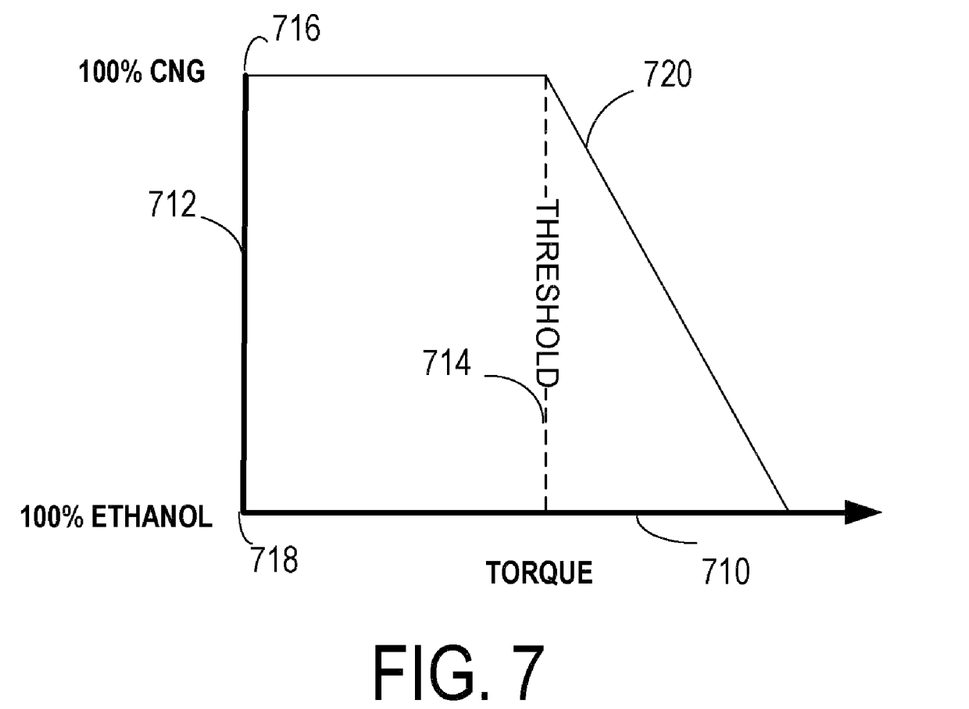
FIG. 7 graphically illustrates variation of the ratio of gaseous/liquid fuel concentration with engine torque.

FIG. 7 figuratively shows an example variation of a gaseous to liquid ratio with desired torque, and in particular shows a selected CNG-ethanol ratio. The horizontal axis 710 represents engine output torque, and the vertical axis 712 represents the ratio of CNG-ethanol concentration. The vertical line 714 represents a threshold torque, below which CNG fuel is used to provide the desired output torque, and above which a combination of CNG and ethanol is used to provide the desired output torque. Point 716 on the vertical axis 712 represents 100% CNG as fuel, and point 718 on the vertical axis 712 represents 100% ethanol as fuel. Points in-between, lying on the vertical axis 712, represent a particular ratio of CNG/ethanol fuel mixture. The graph 720 shows that for lower torques, the engine operates on 100% CNG, whereas once torque crosses threshold value 714, the engine operates on both CNG and ethanol at a particular ratio. This ratio may be based on operating conditions, not limited to, but including the following: engine speed, engine load, engine output (e.g. torque, power, etc), ambient temperature, humidity, knocking, among others and combinations thereof. The approach illustrated in FIG. 7 spreads the available torque through the full operator pedal range of motion to provide increasing engine output as the pedal 132 is further depressed.

FIG. 7 provides one example, for illustrative purposes, of determining the injection amounts at 222 of FIG. 2, for example. Further, as noted herein, when a sufficient supply of both the gaseous and liquid fuel is present, the mapping of FIG. 7 may be used to select the injection type and fuel type for delivery. However, when a supply of gaseous fuel, for example, is sufficiently reduced, the mapping of FIG. 7 may be replaced with an alternative mapping, e.g., one that provides the liquid fuel through the engine output torque range of operation, and reserves the remaining gaseous fuel to be used preferentially for starting, as noted herein. The new mapping may correspondingly increase the liquid fuel injection to compensate for the disabled gaseous fuel injection. In this way, an increased number of improved engine starts can be obtained, while the liquid fuel is used to continue engine operating during warmed up engine running conditions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling operation of an engine, comprising:
    delivering a gaseous fuel to the engine during a first operating range when an amount of stored gaseous fuel is greater than a threshold; and
    disabling the delivery of the gaseous fuel during the first operating range when the amount of stored gaseous fuel is less than the threshold and delivering a second fuel to operate the engine, yet continuing to deliver the gaseous fuel to start the engine during a cold start even when the amount of stored gaseous fuel is less than the threshold.

2. The method of claim 1 wherein the delivering of gaseous fuel includes delivering CNG.

3. The method of claim 1 wherein the delivering of the second fuel includes delivering liquid fuel to the engine.

4. The method of claim 3 wherein the liquid fuel includes E85.

5. The method of claim 3 wherein the liquid fuel is directly injected.

6. The method of claim 1 wherein the deliver of gaseous fuel includes port injecting the gaseous fuel.

7. The method of claim 1 further comprising increasing delivery of the second fuel in response to engine knock during a first operating condition.

8. The method of claim 1 further comprising increasing delivery of the gaseous fuel in response to engine knock.

9. The method of claim 1 further comprising boosting engine operation, and adjusting delivery of the gaseous or second fuel in response to engine boost.

10. The method of claim 1 where the gaseous fuel and the second fuel are mixed and combusted together during at least one operating condition of the engine.

11. The method of claim 1 further comprising adjusting a maximum engine output torque in response to an alcohol content of the second fuel.

12. The method of claim 1 further comprising starting the engine without the second fuel.

13. A system for an engine having a cylinder, comprising:
a first gaseous fuel system including a port injector for delivering the gaseous fuel to the cylinder;
a second liquid fuel system including a direct injector for delivering the liquid fuel to the cylinder;
a controller to operate in a first mode when an amount of stored gaseous fuel is greater than a threshold, wherein during the first mode, the controller delivers the gaseous fuel to the engine during a first operating range; and to operate in a second mode when the amount of stored gaseous fuel is less than the threshold, wherein during the second mode, the controller delivers the liquid fuel to operate the engine during the first operating range, and delivers the gaseous fuel to start the engine during a cold start.

14. The system of claim 13 where during the first mode, the controller delivers both the gaseous fuel and the liquid fuel during the first operating range, and where at least one of the fuels is adjusted responsive to engine knock.

15. The system of claim 14 further comprising a turbocharger, where the controller further adjusts fuel injection in response to the turbocharger operation.

16. The system of claim 15 where the threshold corresponds to a fuel tank pressure of a tank in the gaseous fuel system.

17. The system of claim 16 wherein the liquid fuel system includes an alcohol fuel blend, and where the controller adjusts engine operation responsive to variation in the alcohol fuel blend.

18. A method for controlling operation of an engine, comprising:
delivering a CNG fuel via a port injector and a liquid alcohol-gasoline fuel blend via direct injection to the engine during a first operating range when an amount of stored GNG fuel is greater than a threshold, where during a first portion of the first operating range, CNG fuel injection is increased in response to engine knock, and during a second portion of the first operating range, the alcohol-gasoline fuel is increased in response to engine knock; and
disabling the delivery of the CNG fuel during the first operating range and increasing delivery of the liquid fuel blend when the amount of stored CNG fuel is less than the threshold, yet continuing to deliver the CNG fuel to start the engine during a cold start even when the amount of stored CNG fuel is less than the threshold.

19. The method of claim 18 further comprising starting the engine by delivering the liquid fuel when the amount of stored CNG is less than a second threshold, lower than the first threshold, where before delivery, the liquid fuel is pre-heated.

* * * * *